United States Patent [19]
Castiel

[11] Patent Number: 5,931,417
[45] Date of Patent: Aug. 3, 1999

[54] NON-GEOSTATIONARY ORBIT SATELLITE CONSTELLATION FOR CONTINUOUS COVERAGE OF NORTHERN LATITUDES ABOVE 25° AND ITS EXTENSION TO GLOBAL COVERAGE TAILORED TO THE DISTRIBUTION OF POPULATED LAND MASSES ON EARTH

[75] Inventor: David Castiel, Washington, D.C.

[73] Assignee: Mobile Communications Holdings, Inc., Washington, D.C.

[21] Appl. No.: 07/892,239

[22] Filed: Jun. 2, 1992

[51] Int. Cl.$^6$ .............................. B64G 1/22; H04B 7/185
[52] U.S. Cl. ..................... 244/158 R; 342/352; 455/12.1
[58] Field of Search ........................ 244/158 R; 379/59, 379/60; 455/11.1, 12.1, 13.1, 13.2, 13.3; 342/352, 358, 359, 360

[56] References Cited

U.S. PATENT DOCUMENTS

| | | | |
|---|---|---|---|
| 3,340,531 | 9/1967 | Ke falas et al. | 455/13 |
| 3,349,398 | 10/1967 | Werth . | |
| 3,384,891 | 5/1968 | Anderson | 342/353 |
| 3,497,807 | 2/1970 | Newton . | |
| 4,809,935 | 3/1989 | Draim | 244/158 R |
| 4,854,527 | 8/1989 | Draim | 244/158 R |
| 4,872,015 | 10/1989 | Rosen | 342/353 |
| 4,943,808 | 7/1990 | Dulck et al. | 342/356 |
| 5,120,007 | 6/1992 | Pocha et al. | 244/158 R |

FOREIGN PATENT DOCUMENTS

| | | |
|---|---|---|
| 365585 | 5/1990 | European Pat. Off. . |
| 510789 | 10/1992 | European Pat. Off. . |

OTHER PUBLICATIONS

Beste Design of Satellite Constellatoins for Optimal Continuous Coverage. AES–14 No. 3 May 1978.

Neyret et al. "The Intesat VII Spacecraft" AIAA 13$^{th}$ Communications Satellite Systems Conf. Mar. 1990.

Benedicto A Medium –Altitude Global Mobile Satellite System for Personal Communications at L–band Jun. 1992.

Dondl, Digital Network Oriented Mobile Radio Satellite System as an Integrated Part of GSM Celleluar Radio System in Europe.

Draim et al., "Satellite Constellations for Optimal Northern Hemisphere Coverage" Oct. 1983.

G.V. Mozhaev The Problem of Continuous Earth Coverage and Kinematically Regular Satellite Networks. II Cosmic Research vol. II Jan.–Feb. 1973.

H. H. Ballard, "Rosette Constellations of Earth Satellites" IEEE Transactions on Aerospace and Electronics. vol. AES–16, No. 5 (Sep. 1980).

*Primary Examiner*—Virna Lissi Mojica
*Attorney, Agent, or Firm*—Fish & Richardson P.C.

[57] ABSTRACT

A non-geostationary low earth orbit satellite constellation using elliptical orbits with apogees in the Northern Hemisphere to provide continuous coverage over the Continental United States of America (CONUS), and by extension to the other points in the Northern Hemisphere situated above 25° north latitude. The constellation provides time-continuous visibility with at least one satellite to any point above 25° North latitude. An extension of the constellation has a combination of the elliptical orbits and at least one equatorial orbit to provide virtual global coverage. The distribution of capacity is deployed in proportion to the distribution of populations in the land masses of the earth. Time continuous visibility with at least one satellite is maintained by any point on earth north of the 50° South latitude, with a minimum number of satellites deployed. All satellites sharing the same orbit, or type of orbit, in the constellations above have the same orbital period, same apogee altitude and same perigee point. For all elliptical orbits in the constellation herein the argument of perigee can be adjusted to provide optimal service to specific regions (CONUS, Northern Europe, etc.)

5 Claims, 6 Drawing Sheets

NON-GEOSTATIONARY ORBIT SATELLITE CONSTELLATION FOR CONTINUOUS COVERAGE OF NORTHERN LATITUDES ABOVE 25° AND ITS EXTENSION TO GLOBAL COVERAGE TAILORED TO THE DISTRIBUTION OF POPULATED LAND MASSES ON EARTH

FIELD OF THE INVENTION

The invention relates generally to a multi-satellite constellation in low earth orbit which provides continuous coverage over specifically designated regions. More specifically, the system provides continuous coverage to the populated land masses of the earth and wherein such coverage is tailored to the population density of the land masses therein.

BACKGROUND AND SUMMARY OF THE INVENTION

This application discloses a new, improved class of satellite constellation that provides continuous satellite coverage of the earth's surface above 25° of north latitude, and by extension global coverage in proportion to the population densities by latitude. The constellation consists of satellites in low altitude (below 4,000 kilometers) inclined elliptical orbits with northern apogees, and in its extension with a subconstellation of satellites with equatorial orbits, these being either circular or elliptical.

The basic constellation provides maximum satellite coverage above 25° of north latitude, that is, over the earth's northern temperate zones. It is optimized to provide service to the United States, Canada, Europe, the Middle East, the former Soviet Union, China, Korea and Japan. In its extension the constellation provides maximum coverage and satellite resources above 25° of north latitude, where the bulk of the world's population lies; it further provides gradually reduced satellite resources but continuous coverage below 25° north, down to 50° of south latitude with minimum horizon look angles of 15° at all times.

The amount of coverage and deployed satellite resources can be increased by overlaying arrays of satellites with suitable offsets or by varying the number of satellites in each subconstellation. The invention applies to any constellation of satellites of the earth where at least twelve satellites in the constellation are in inclined elliptical orbits with apogees in the northern hemisphere below 4,000 kilometers in altitude, and at least six satellites in the constellation are in one equatorial orbit.

While communications satellites, by virtue of their altitudes which can range from hundreds to thousands of kilometers above the earth, can see and serve large areas of the earth at once, satellites are very limited in how they move about the earth by the well known laws of planetary motion. For example, all satellites must revolve about the earth following an elliptical path (including circular paths, which are ellipses of zero eccentricity), and their orbits always lie in a plane that contains the center of the earth. Those seeking to provide satellite communications services have for many years sought ways to construct orbits or constellations of orbits that, while obeying the laws of planetary motion, tailored the amount of satellite coverage and of satellite resources made available to conform to the demand of services in specific geographic areas.

Early satellite orbits were relatively circular and low in altitude (only several hundred kilometers). In such low orbits, the satellites rotate around the earth at speeds higher than earth's own rotation about its axis; consequently a single satellite is in view of a specific region of earth for only a limited time interval. Many satellites are thus required to provide continuous coverage to a particular service area.

It was quickly realized that the inclination, relative to the equator, of the orbital plane of these satellites could be adjusted to optimize the coverage that the satellite constellation provided to the preferred service areas. The Echo satellites were an example of such an approach. This approach tailored the maximum extent in latitude north and south to which satellites would provide service. However coverage was symmetrical about the equator, with an unavoidable fixed distribution of coverage and other satellite resources having a slight preference in coverage for latitudes near the latitude limits over those near the equator.

Later, equatorial geosynchronous satellites became feasible and the preferred approach to provide optimum satellite coverage to a specific service area. Satellites launched into this circular orbit, having a period of 24 hours and zero inclination, revolve about the earth in step with the rotation of the earth. Consequently the satellite appears to remain stationary above a fixed point on the earth's surface. This orbit permits adjusting the satellite longitudinal coverage on the earth to a preferred longitude, but the satellite latitudinal coverage is fixed in a pattern that is symmetrical about the equator, and that favors areas nearest the equator. Moreover, satellites in these orbits do not provide coverage beyond about 70° latitude north or south. These orbits are also very high (22,300 miles), resulting in more expensive satellite and launch costs. Signal delays to and from these satellites can be objectionable, and signal path losses are high, requiring more powerful and sensitive communications equipment.

In recent times another difficulty with geosynchronous satellites has arisen. The geosynchronous equatorial orbit used by these satellites is becoming very crowded. Available positions for future satellites—orbital "slots"—are dwindling.

In order to compensate for poor coverage at high latitudes, as provided by geosynchronous satellites, orbits inclined relative to the equator were considered. For example the United States Milstar satellite system was designed to use inclined circular orbits to obtain better coverage at higher latitudes. However, even in this case, the satellites spend as much time over the southern hemisphere as over the northern.

To provide better and selective coverage at high latitudes, the Soviet Union developed the Molniya satellite system using highly elliptical orbits with apogees in the northern hemisphere. This constellation provides better coverage at higher northern latitudes. The relatively high orbit, (about 40,000 km of apogee by 426 km of perigee with a 12 hour orbital period), combined with the high inclination (63.4°), of the Molniya satellites gives some longitude preference to the Soviet Union and the United States over other longitudes. This inclination prevents precession of the line of apsides (line containing the semi-major axis of the ellipse) around the orbit with an argument of perigee of 270°, i.e. apogee at the northernmost point of the orbit. Since in inclined elliptical orbits satellites appear to linger at the apogee and race past the point of perigee, these orbits provide very good coverage of the northern latitudes of the former Soviet Union while spending relatively little time in the southern latitudes where they are not needed. Molniya satellites in orbits with a northern apogee in fact do not, and are not intended to, provide continuous coverage of southern latitudes. The Washington/Moscow Hot line used Molniya satellites.

A combination of Molniya orbits, some with northern apogees and some with southern apogees, could provide global coverage. However, coverage would be symmetrical about the equator.

U.S. Pat. No. 4,854,527 describes a constellation of elliptical orbits that provides continuous coverage at all altitudes (above those which correspond to a 27-hour period) with a minimum of four satellites, two having apogees in the northern hemisphere and two in the southern hemisphere. The satellites define the points of a continually rotating tetrahedron whose sides never or almost never intersect the earth.

Several observations can be made concerning the Draim constellation. First, continuous coverage using this constellation requires satellite periods of at least 27 hours and concomitant altitudes even higher than those of geosynchronous altitudes. As a result, satellites for these orbits would be expensive to build and launch, and voice communications would suffer from unacceptable delays. Second, minimum elevation angles are very low, 4° or less, even for constellations with periods of as much as 100 hours. For many satellite systems, and especially so in mobile applications, such low elevation angles would be impractical. And third, while this constellation provides continuous global coverage, it shows relatively little preference for one region over another. In fact, the very high satellite operating altitudes would mitigate against significant regional preferences. By requiring the existence of at least a tetrahedron, or a polyhedron by extension, the Draim constellation does not offer the possibility to serve selectively one hemisphere. Nor does Draim allow us to tailor the satellite resources offered in one area to existing conditions, such as population density.

Draim is basically and practically symmetrical above and below the equator: coverage in the southern latitudes would be as intense as that in the northern latitudes, despite the fact that there is much less land mass in the southern latitudes than in the northern latitudes. Coverage of the equator is also weaker than in the southern latitudes, just the opposite of that which is desired. Even for asymmetrical subconstellations using the Draim basic configuration (the tetrahedron), when the northern elliptical subconstellation would have different orbital parameters than the southern subconstellation, the two subsets are practically independent of each other. In fact resources deployed for southern use do not contribute to northern capabilities.

The Molniya and Draim satellites have very high apogees, essentially the same as the altitude of geosynchronous satellites, thus they share the same delay problems and suffer from the corresponding complexity and cost constraints associated with satellites operating at such high altitudes.

Lower altitude elliptical orbits can reduce the expense and complexity of the satellites, but at the expense of coverage at lower latitudes and a requirement for more satellites to provide continuous coverage. The earth's Van Allen radiation belt prevents the use of intermediate altitudes that transit the belts (between around 3,000 and 8,000 kilometers).

The ELLIPSO I satellite system, filed before the United States Federal Communications Commission in November, 1990, FCC file number 11-DSS-P-91(6), "Ellipso I, An Elliptical Orbit Satellite System", and Public Notice, DA91-407, released Apr. 1, 1991 also used elliptical orbits with northern apogees to provide preferred coverage to the temperate zone of the northern hemisphere. This zone contains the bulk of the likely market in the near future for mobile satellite communication services, for which the ELLIPSO I system was intended. This satellite constellation uses lower orbital altitudes ("LEO") in order to lessen satellite costs and provide service at all northern latitudes around the globe, regardless of longitude. The ELLIPSO I satellite orbits have maximum altitudes of 1250 kilometers and minimum altitudes of 500 kilometers, inclined at 63.4°. Like the Molniya satellite system, the ELLIPSO I system did not provide continuous coverage below a specified altitude, in ELLIPSO I's case, below around 30° north latitude.

Other circular LEO systems of the same class have subsequently been proposed involving a much higher number of satellites to provide homogeneous service, uniformly distributed around the earth. For example, Motorola's Iridium system consists of 77 satellites in circular polar orbit. Another example is Loral Systems Globalstar, an inclined circular LEO constellation of 48 satellites. But a look at a globe of the earth will reveal that there is much more populated land mass north of the equator than south of it. In addition, the distribution of land mass is not at all symmetric about the equator. Therefore circular orbit LEO constellations are not efficient in providing coverage in proportion to the earth's populated land masses.

In conclusion, notwithstanding the approaches taken by the above described systems, no low altitude satellite constellation has yet been developed that is optimized to cover all the areas of the northern temperate latitudes in a proper proportion. Furthermore, no constellation has been developed, revealed, or proposed, that is tailored to provide coverage to the populated land masses of the earth as a whole, and wherein such coverage is in proportion to the population densities of said land masses. Finally no constellation has been proposed that permits its gradual deployment, while demand develops and partially financed by said demand; this unique aspect of the invention herein offers a most important, and perhaps essential economic basis for the deployment of the constellation.

Satellite constellations to date have required the entire capital investment to be spent before services are offered and revenues generated; this prevents the financing of the system, at least partially, to be made from revenues generated from usage fees. In addition to other aims related to the optimization of coverage and cost of the constellation, this invention aims also at emulating for the first time for satellite systems the economic environment in which terrestrial system are deployed, gradual and in step with the development of user demand. The presentation and claim of such a class of constellation is the object of this invention. The principal characteristics of the present invention were publicly disclosed in a filing with the Federal Communications Commission submitted on Jun. 3, 1991: FCC File no. 18-DDS-P-91(18), "ELLIPSO II, An Elliptical Orbit Satellite System." See also Public Notice DA 91-1308 released Oct. 14, 1991.

In consequence of the above observations, the objects of the present invention are as follows.

Provision of continuous satellite coverage of the earth's northern temperate zone from low (below 4000 km) satellite altitudes.

Provision of continuous satellite coverage of the earth's surface that is in proportion to the distribution of population over the earth by latitude. In distinction, continuous global coverage of the earth is not an required objective of the invention.

Provision of a constellation of satellites that permits the gradual and progressive deployment to conform to local demand requirements.

Provision of a constellation of satellites that makes efficient use of satellite resources for continuously serving populations of users around the earth in the northern temperate zone while minimizing coverage of other areas.

Provision of a constellation of satellites that makes efficient use of satellite resources while providing coverage to regions of the earth in proportion to population density, without wasting satellite resources in areas of low population density, such as the southern oceans or the polar regions.

Provision of satellite service to mobile and fixed users, using satellites in orbits that are relatively low compared to satellites in geosynchronous equatorial orbit, so as to reduce satellite launch expense, satellite complexity and weight, and communications path delay times.

Provision of continuous satellite coverage over the earth's northern temperate zone in such a way as to obtain the most service for the least number of satellites, all else being equal.

Provision of continuous satellite coverage over the world's populated land masses in such a way as to obtain the most service, mobile and fixed, for the least number of satellites, all else being equal.

Provision of continuous satellite service to the world's populated areas at inexpensive service rates especially for mobile service as a consequence of an efficient constellation design.

Provision of service from a constellation of satellites that is in constant motion relative to any point on earth, so that if any satellite failure occurs within the constellation, no one service region will be catastrophically penalized above any other. Instead a much smaller reduction in service will occur over a larger area.

DETAILED DESCRIPTION OF THE INVENTION

This specification describes an elliptical orbit satellite system that is optimized for covering the northern temperate zone of the earth. Compared to circular LEO constellations, this constellation gives a superior satellite availability in the required regions for a given number of satellites in orbit. Alternatively, it requires fewer satellites to obtain a given level of coverage over the northern temperate zone than other LEO systems with comparable characteristics. Land mobile satellite communications is an example of an application for this class of satellite constellation.

The class of satellite constellations described by this specification are those having satellites in inclined LEO elliptical orbits with apogees over the northern hemisphere. As an example, for an elliptical orbit inclined at 63.4° with apogee altitudes of around 3,000 kilometers and perigees of around 400 kilometers, the Van Allen radiation belts can be substantially avoided and continuous satellite coverage will exist for all latitudes from 25° north latitude to the arctic. The heavy coverage of the northern latitudes is not duplicated in the corresponding southern latitudes, where far less of the world's population dwells.

Satellites in orbits with different parameters will require a different number of satellites to provide continuous coverage. The inclined orbit selections can be tailored to provide the amount of coverage demanded by satellite system requirements. The essential claim established by this specification is the combination of inclined LEO elliptical orbits with northern apogees below 4,000 kilometers.

This specification also describes the extension of this class of satellite constellation to a constellation that combines two complementary orbit types (inclined elliptical and equatorial), and wherein the constellation is aimed at optimizing the satellite coverage according to the north-south distribution of the earth's land mass. The extended constellation gives a superior satellite availability for a given number of satellites in orbit, or alternatively requires fewer satellites to obtain a given level of coverage over the populated land masses of the earth, than other LEO systems.

In its extension, this class of satellite constellation uses the basic constellation class designed to provide optimum coverage to the northern temperate latitudes with satellites in inclined LEO elliptical orbits with apogees over the northern hemisphere below 4,000 kilometers, and is complemented by a subconstellation of satellites in equatorial orbits. Such combined constellation class provides additional coverage and satellite resources to the northern temperate latitudes, and basic coverage to southern temperate latitudes.

As an example, which is not meant to exclude other constellations with variations of the following parameters, for an elliptical orbit inclined at 63.4° with apogee altitudes of around 3,000 kilometers and perigees of around 400 kilometers altitude, and with an argument of perigee at 270° and longitudes of the ascending node at 0°, 120° and 240° with six satellites per orbit plane, combined with nine satellites in an equatorial orbit at less than 10,000 km, the Van Allen radiation belts can be substantially avoided and continuous satellite coverage will exist for all latitudes from the North Pole to 50° South latitude.

In this case the elliptical orbits cover latitudes from 25° North latitude to the North Pole, while the equatorial orbit cover from 50° North to 50° South latitude depending on altitude, and assuming a minimum 15° look angle to the satellite. Double continuous coverage exists above 40° South, triple coverage between 23° North and 40° North, and double coverage above 40° North. Partial coverage is provided elsewhere.

The two orbits result in overlapping continuous coverage between the latitudes of around 23° north and 50° north. This band receives the most capacity, since satellites in both orbit types cover it. This is precisely the band of latitudes that contains the greatest bulk of the world's population. This band includes the United States, much of Europe and the populous areas of North Africa, all of the Middle East, the northern part of India, ninety five per cent of China, and all of Korea and Japan. Areas to the north and south of this band of latitudes receive continuous coverage from only one of the two orbit types. Latitudes to the north are covered by the inclined elliptical orbits and partially by the equatorial orbit, while southern latitudes are served by the equatorial satellites. Unlike any other global constellation of satellites, the heavy coverage of the northern latitudes is not duplicated in the corresponding southern latitudes, where far less of the world's population dwells.

Satellites in orbits with different parameters will require a different number of satellites to provide continuous coverage. The inclined and equatorial orbit selections can be tailored to provide the amount of coverage demanded by satellite system requirements. The essential claim established by this specification is the combination of inclined LEO elliptical orbits with northern apogees and equatorial orbits.

Figure 1:
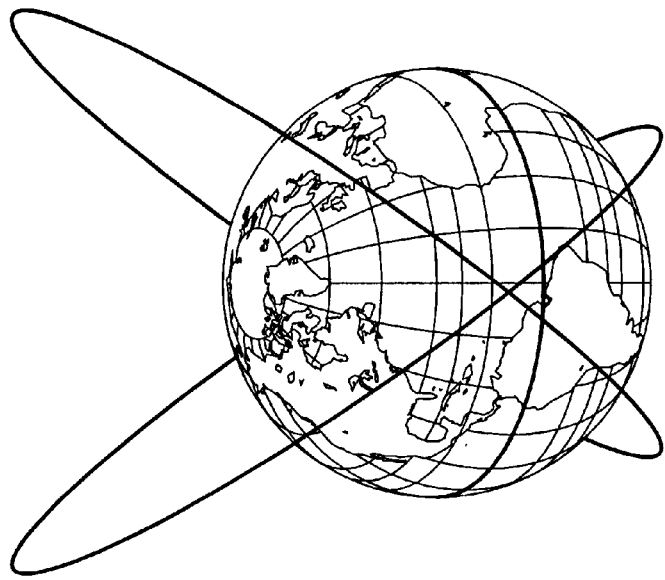
FIG. 1. View of two and three orbit systems (minimum configurations)
Figure 1:
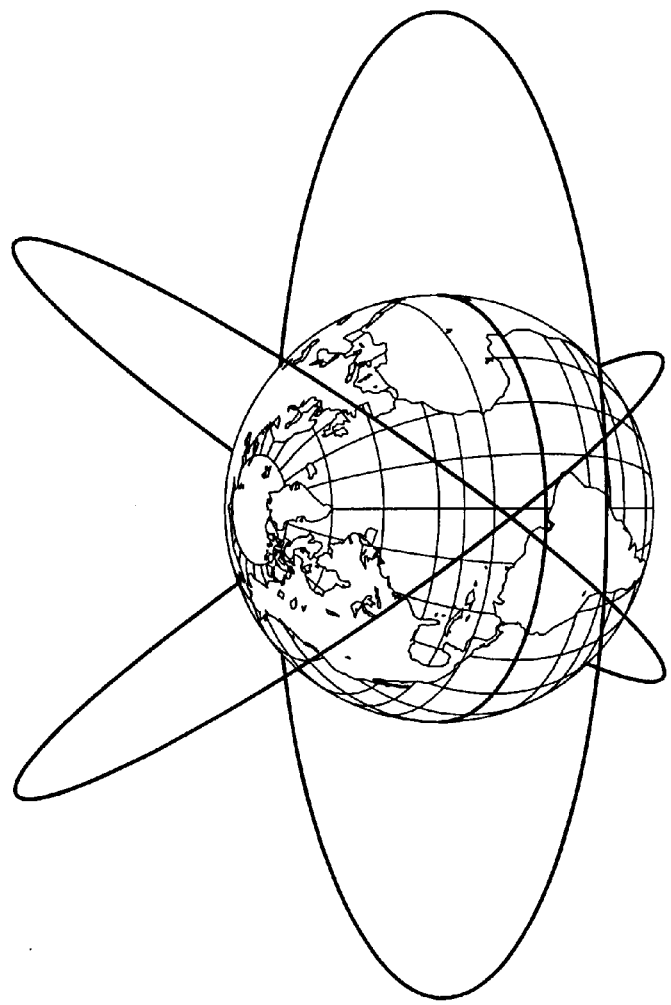
Figure 2:
FIG. 2. Coverage of Northern Hemisphere indicating continuity above 25° North latitude at 15° elevation angle for a 12-satellite, two orbit system with eccentricity 0.154, and with apogee at 2903 kilometers, and argument of perigee at 270°. Circles indicate footprints of satellites over area of interest at a given time.
Figure 3:
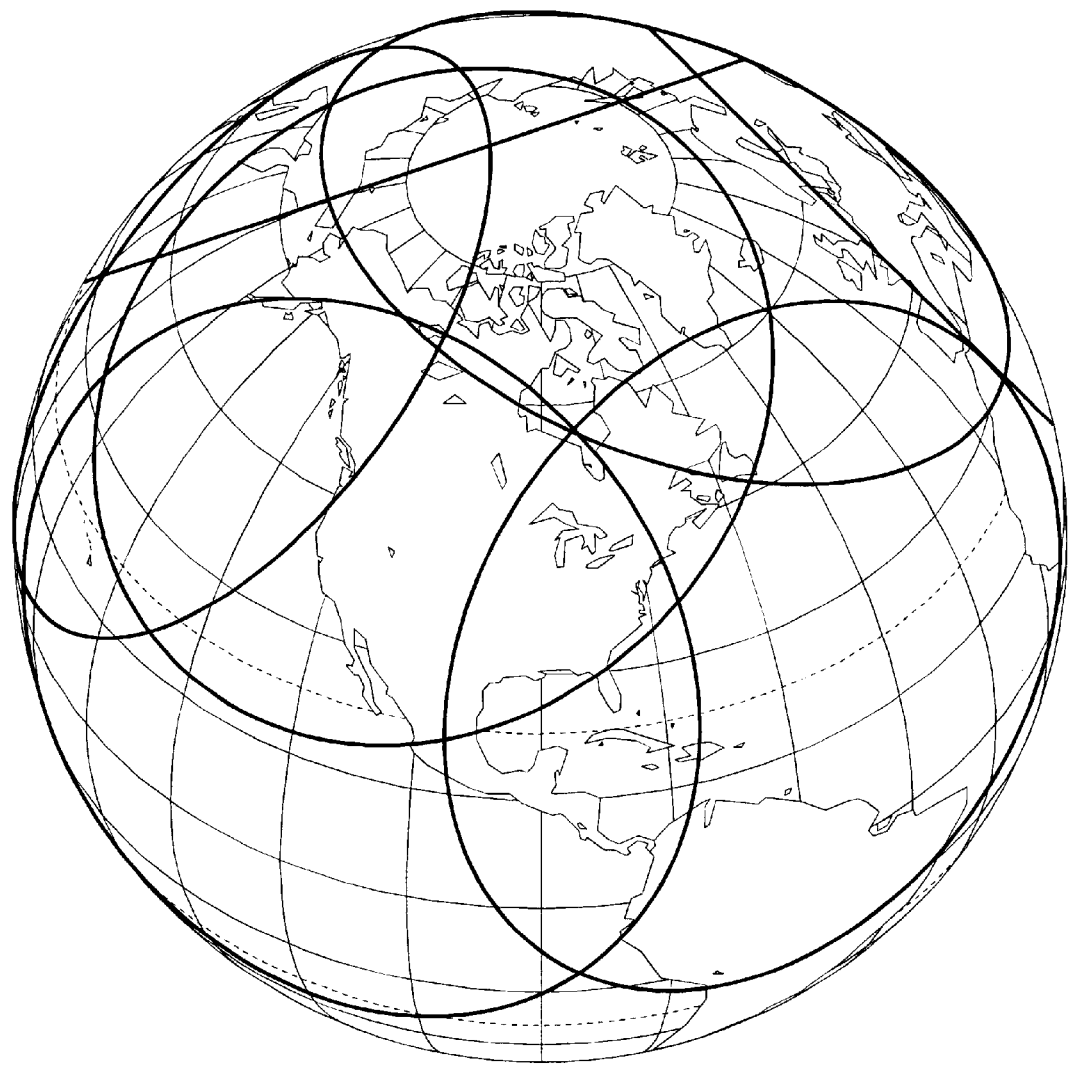
FIG. 3. Coverage for constellation comprising twelve elliptic satellites as in FIG. 2 and six equatorial satellites in a circular orbit of altitude equal to the apogee of the elliptical orbits.
Figure 4:
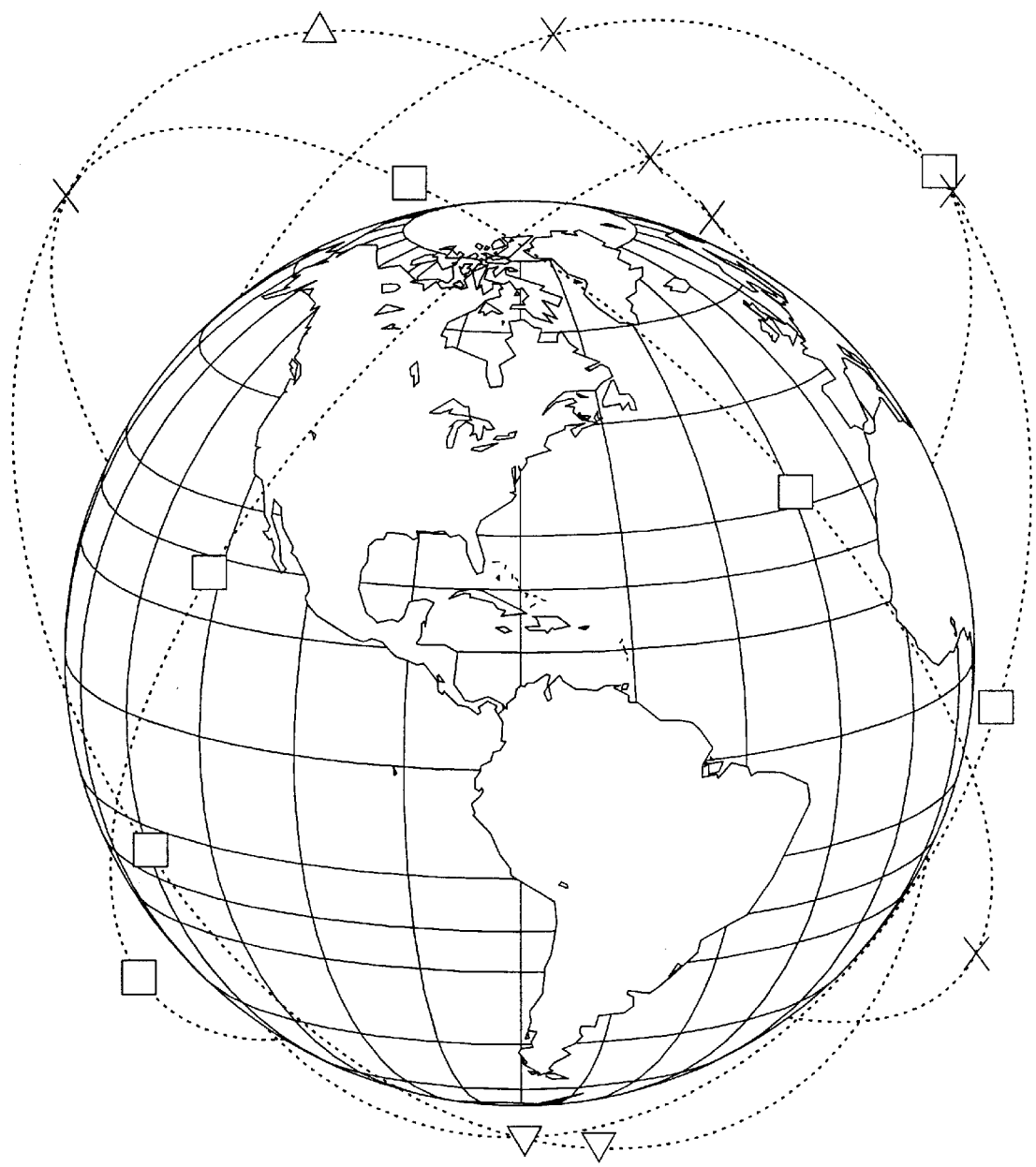
FIG. 4. Constellation of 24 satellites in four elliptical planes, with orbital parameters equal to those in FIG. 2.
Figure 5:
FIG. 5. Coverage for 24-satellite constellation as in FIG. 4 showing continuous coverage even for near equatorial regions.
Figure 6:
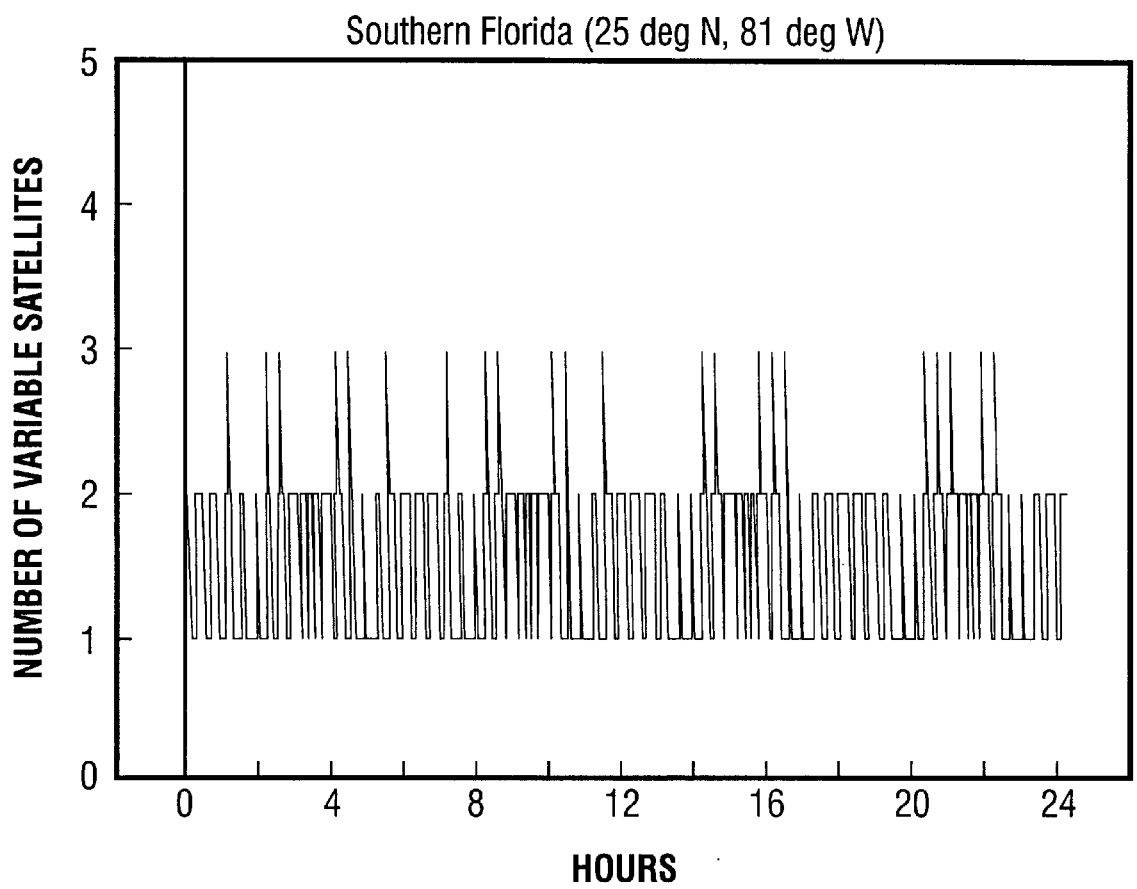
FIG. 6. Coverage statistics for southernmost point in CONUS with constellation depicted in FIGS. 4 and 5. The number of satellites visible from that point varies with the time of day.

Table 1. Coverage statistics for a variety of constellation combinations. Minimum indicates percent of the day visibility is achieved by at least one satellite for the point with worst coverage. Maximum indicates corresponding point of best coverage.

Table 2. Coverage statistics for 4426-point grid of CONUS indicating maximum time gap duration, for 12 and 18 satellite constellations. Points are spaced by 0.5° (55.66 km) and time intervals are 30 seconds. Ranges: latitude 25° N to 48.5° N; longitude 67° W to 125° W, for elevation angles of 15°.

Table 3. Same as Table 2 above for 5° elevation angles.

DEFINITIONS

Argument of perigee: the angle in the orbit plane between the ascending node and the perigee point
Elevation angle: the angle between the horizon and the line-of-sight to the satellite
Inclination: the angle between the orbital plane and the equator
Longitude of ascending nodes: the angle between the point where a given satellite crosses the equator and the point where the reference satellite crosses that same plane.
Mean Anomaly: a mathematical expression used to determine the time of flight between a reference point and a general point
Right Ascension of Ascending Node (RAAN): the angle between the reference orbital plane and the plane for which RAAN is measured.
Satellite resources: resources the usage of which is sought and for which the constellation is deployed; for example, in a communications system, the communications channels provided by the satellites.

TABLE 1

| Constellation | Coverage | | | |
|---|---|---|---|---|
| | Average | Maximum | Minimum | Std Dev |
| 2 Planes × 6 Sats (5' elev) 425 × 2903 | 99.73 | 100.00 | 95.56 | 0.82 |
| 2 Planes × 6 Sats (15' elev) 425 × 2903 | 89.49 | 100.00 | 80.37 | 13.33 |
| 2 Planes × 6 Sats (5' elev) 425 × 3200 | 99.99 | 100.00 | 99.31 | 0.07 |
| 2 Planes × 6 Sats (15' elev) 425 × 3200 | 92.85 | 100.00 | 65.72 | 10.70 |
| 3 Planes × 6 Sats (5' elev) 425 × 2903 | 99.68 | 100.00 | 93.68 | 0.98 |

TABLE 1-continued

| Constellation | Coverage | | | |
|---|---|---|---|---|
| | Average | Maximum | Minimum | Std Dev |
| 3 Planes × 6 Sats (15' elev) 425 × 2903 | 89.96 | 100.00 | 61.49 | 11.93 |
| 3 Planes × 6 Sats (5' elev) 425 × 3200 | 89.98 | 100.00 | 98.96 | 0.11 |
| 3 Planes × 8 Sats (15' elev) 425 × 3200 | 93.05 | 100.00 | 65.65 | 8.84 |
| 6 Planes × 3 Sats (5' elev) 425 × 2903 | 95.49 | 100.00 | 80.50 | 5.78 |
| 6 Planes × 3 Sats (15' elev) 425 × 2903 | 78.99 | 98.54 | 59.20 | 12.26 |
| 6 Planes × 3 Sats (5' elev) 425 × 3200 | 96.81 | 100.00 | 84.32 | 4.64 |
| 6 Planes × 3 Sats (15' elev) 425 × 3200 | 82.03 | 100.00 | 63.36 | 11.99 |
| 2 Planes × 6 Sats + Eq High (5' elev) 425 × 2903 | 100.00 | 100.00 | 100.00 | 0.00 |
| 2 Planes × 6 Sats + Eq High (15' elev) 425 × 2903 | 85.49 | 100.00 | 87.37 | 4.53 |
| 2 Planes × 6 Sats + Eq High (5' elev) 425 × 3200 | 100.00 | 100.00 | 100.00 | 0.00 |
| 2 Planes × 6 Sats + Eq High (15' elev) 425 × 3200 | 97.34 | 100.00 | 89.59 | 3.28 |
| 2 Planes × 6 Sats + Eq Low (5' elev) 425 × 2903 | 99.84 | 100.00 | 98.18 | 0.57 |
| 2 Planes × 6 Sats + Eq Low (15' elev) 425 × 2903 | 89.50 | 100.00 | 60.79 | 13.30 |
| 2 Planes × 6 Sats + Eq Low (5' elev) 425 × 3200 | 99.99 | 100.00 | 99.51 | 0.04 |
| 2 Planes × 6 Sats + Eq Low (15' elev) 425 × 3200 | 92.86 | 100.00 | 66.00 | 10.68 |
| 1 Plane × 6 Sats (5' elev) 500 × 1250 | 38.04 | 61.14 | 27.00 | 8.18 |
| 2 Planes × 3 Sats (5' elev) 500 × 1250 | 38.86 | 49.69 | 28.23 | 7.51 |
| 2 Planes × 6 Sats (5' elev) 500 × 1250 | 71.53 | 93.06 | 44.90 | 16.32 |
| 2 Planes × 9 Sats (5' elev) 500 × 1250 | 82.51 | 100.00 | 54.13 | 17.17 |
| 2 Planes × 12 Sats (5' elev) 500 × 1250 | 84.54 | 100.00 | 56.35 | 16.63 |
| 4 Planes × 6 Sats (5' elev) 500 × 1250 | 95.33 | 100.00 | 88.47 | 5.25 |
| 2 Planes × 3 Sats (5' elev) 500 × 1250 (double) | 0.11 | 0.90 | 0.00 | 0.19 |
| 4 Planes × 6 Sats (5' elev) 500 × 1250 (double) | 59.39 | 92.37 | 24.15 | 22.27 |
| Ellipso 1 & 2 2 × 3, 2 × 6, 1 × 6 Low (5' elev - single) | 99.85 | 100.00 | 97.38 | 0.46 |
| Ellipso 1 & 2 2 × 3, 2 × 6, 1 × 6 Low (5' elev - double) | 82.18 | 92.78 | 64.25 | 8.10 |
| 2 Planes × 6 Sats (5' elev) 425 × 2903 (double) | 57.83 | 75.99 | 39.49 | 10.30 |
| 2 Planes × 6 Sats (5' elev) 425 × 3200 (double) | 66.17 | 83.41 | 45.86 | 10.17 |
| 6 Planes × 3 Sats (5' elev) 425 × 2903 (double) | 82.41 | 100.00 | 65.02 | 12.98 |
| 6 Planes × 3 Sats (5' elev) 425 × 3200 (double) | 87.49 | 100.00 | 71.48 | 11.22 |
| 2 Planes × 6 Sats + Eq High (5' elev) 425 × 2303 (dbl) | 87.06 | 100.00 | 65.85 | 11.81 |
| 4 Planes × 6 Sats (5' elev) 425 × 2903 (double) | 99.99 | 100.00 | 99.44 | 0.06 |
| 4 Planes × 6 Sats (5' elev) 425 × 3200 (double) | 100.00 | 100.00 | 100.00 | 0.00 |
| 2 Planes × 3 Sats + 6 + 2 × 6 @ 425 × 2903 (sgl - 5') | 99.85 | 100.00 | 98.89 | 0.18 |
| 2 Planes × 3 Sats + 6 + 2 × 6 @ 425 × 2903 (dbl - 5') | 89.58 | 98.61 | 62.60 | 8.58 |
| 2 Planes × 3 Sats + 6 + 2 × 6 @ 425 × 2903 (sgl - 15') | 92.19 | 100.00 | 72.17 | 7.95 |
| 2 Planes × 3 Sats + 6 + 2 × 6 @ 425 × 2903 (dbl - 15') | 49.11 | 81.19 | 14.78 | 17.56 |

TABLE 2

Elevation Constraint 1

| Latitude | Average | | | Maximum Outage (min) | | | Longest in View (min) | | |
|---|---|---|---|---|---|---|---|---|---|
| (deg) | Average | Maximum | Minimum | Average | Maximum | Minimum | Average | Maximum | Minimum |
| 25.0 | 94.40 | 95.42 | 93.37 | 8.2 | 9.5 | 7.0 | 438.0 | 484.0 | 364.5 |
| 25.5 | 94.83 | 95.73 | 93.89 | 7.8 | 9.0 | 7.0 | 438.3 | 484.0 | 364.5 |
| 26.0 | 95.29 | 96.04 | 94.48 | 7.5 | 9.0 | 6.5 | 439.4 | 503.5 | 364.0 |
| 26.5 | 95.87 | 96.29 | 95.04 | 7.2 | 8.5 | 6.0 | 419.5 | 483.5 | 346.5 |
| 27.0 | 96.04 | 96.53 | 95.52 | 6.9 | 8.0 | 6.0 | 374.3 | 464.5 | 344.0 |
| 27.5 | 96.43 | 96.88 | 96.08 | 6.6 | 7.5 | 5.0 | 375.8 | 483.5 | 344.0 |
| 28.0 | 96.82 | 97.22 | 96.32 | 6.2 | 7.0 | 4.5 | 383.4 | 487.5 | 347.5 |
| 28.5 | 87.20 | 87.57 | 96.63 | 5.8 | 6.5 | 4.5 | 390.6 | 487.5 | 347.5 |
| 29.0 | 97.59 | 97.99 | 96.84 | 5.8 | 6.5 | 4.5 | 429.3 | 502.5 | 358.5 |
| 29.5 | 97.92 | 98.20 | 97.54 | 5.8 | 6.5 | 4.0 | 454.4 | 502.5 | 383.0 |
| 30.0 | 98.21 | 98.47 | 97.78 | 5.7 | 6.5 | 4.0 | 459.5 | 502.5 | 399.0 |
| 30.5 | 98.48 | 88.72 | 88.16 | 5.7 | 6.0 | 4.0 | 467.1 | 541.5 | 399.5 |
| 31.0 | 98.73 | 99.03 | 98.37 | 5.4 | 6.5 | 4.0 | 482.0 | 546.5 | 400.0 |
| 31.5 | 96.90 | 99.20 | 98.51 | 5.1 | 6.5 | 4.0 | 496.7 | 552.0 | 441.0 |
| 32.0 | 99.04 | 99.31 | 98.65 | 4.7 | 6.5 | 3.5 | 502.4 | 556.0 | 466.0 |
| 32.5 | 99.15 | 99.48 | 98.79 | 4.4 | 6.0 | 3.0 | 507.6 | 556.0 | 466.0 |
| 33.0 | 88.26 | 99.51 | 88.82 | 4.1 | 5.5 | 2.5 | 525.6 | 1052.0 | 466.0 |
| 33.5 | 99.36 | 99.85 | 98.99 | 3.8 | 5.0 | 2.0 | 563.0 | 1052.0 | 468.0 |
| 34.0 | 99.47 | 99.72 | 99.13 | 3.3 | 5.0 | 1.5 | 675.2 | 1052.5 | 466.0 |
| 34.5 | 99.58 | 99.83 | 99.24 | 3.0 | 5.0 | 1.5 | 699.6 | 1053.0 | 488.0 |
| 35.0 | 99.65 | 99.86 | 99.38 | 2.7 | 4.5 | 1.0 | 732.0 | 1072.0 | 509.5 |
| 35.5 | 99.73 | 99.93 | 99.51 | 2.3 | 3.5 | 0.5 | 777.3 | 1137.5 | 510.0 |
| 36.0 | 99.79 | 99.87 | 99.62 | 1.9 | 3.0 | 0.5 | 850.8 | 1138.5 | 554.0 |
| 36.5 | 99.84 | 100.00 | 99.72 | 1.5 | 2.5 | 0.0 | 929.4 | 1440.0 | 553.5 |
| 37.0 | 99.89 | 100.00 | 99.79 | 1.1 | 2.0 | 0.0 | 985.1 | 1440.0 | 575.5 |
| 37.5 | 89.83 | 100.00 | 99.83 | 0.8 | 1.5 | 0.0 | 1061.6 | 1440.0 | 897.0 |
| 38.0 | 99.97 | 100.00 | 99.90 | 0.4 | 1.0 | 0.0 | 1200.8 | 1440.0 | 897.0 |
| 38.5 | 99.99 | 100.00 | 99.97 | 0.1 | 0.5 | 0.0 | 1329.4 | 1440.0 | 889.5 |
| 39.0 | 100.00 | 100.00 | 100.00 | 0.0 | 0.0 | 0.0 | 1440.0 | 1440.0 | 1440.0 |
| 39.5 | 100.00 | 100.00 | 100.00 | 0.0 | 0.0 | 0.0 | 1440.0 | 1440.0 | 1440.0 |
| 40.0 | 100.00 | 100.00 | 100.00 | 0.0 | 0.0 | 0.0 | 1440.0 | 1440.0 | 1440.0 |
| 40.5 | 100.00 | 100.00 | 100.00 | 0.0 | 0.0 | 0.0 | 1440.0 | 1440.0 | 1440.0 |
| 41.0 | 100.00 | 100.00 | 100.00 | 0.0 | 0.0 | 0.0 | 1440.0 | 1440.0 | 1440.0 |
| 41.5 | 100.00 | 100.00 | 100.00 | 0.0 | 0.0 | 0.0 | 1440.0 | 1440.0 | 1440.0 |
| 42.0 | 100.00 | 100.00 | 100.00 | 0.0 | 0.0 | 0.0 | 1440.0 | 1440.0 | 1440.0 |
| 42.5 | 100.00 | 100.00 | 100.00 | 0.0 | 0.0 | 0.0 | 1440.0 | 1440.0 | 1440.0 |
| 43.0 | 100.00 | 100.00 | 100.00 | 0.0 | 0.0 | 0.0 | 1440.0 | 1440.0 | 1440.0 |
| 43.5 | 100.00 | 100.00 | 100.00 | 0.0 | 0.0 | 0.0 | 1440.0 | 1440.0 | 1440.0 |
| 44.0 | 100.00 | 100.00 | 100.00 | 0.0 | 0.0 | 0.0 | 1440.0 | 1440.0 | 1440.0 |
| 44.5 | 100.00 | 100.00 | 100.00 | 0.0 | 0.0 | 0.0 | 1440.0 | 1440.0 | 1440.0 |
| 45.0 | 100.00 | 100.00 | 100.00 | 0.0 | 0.0 | 0.0 | 1440.0 | 1440.0 | 1440.0 |
| 45.5 | 100.00 | 100.00 | 100.00 | 0.0 | 0.0 | 0.0 | 1440.0 | 1440.0 | 1440.0 |
| 46.0 | 100.00 | 100.00 | 100.00 | 0.0 | 0.0 | 0.0 | 1440.0 | 1440.0 | 1440.0 |
| 46.5 | 100.00 | 100.00 | 100.00 | 0.0 | 0.0 | 0.0 | 1440.0 | 1440.0 | 1440.0 |
| 47.0 | 100.00 | 100.00 | 100.00 | 0.0 | 0.0 | 0.0 | 1440.0 | 1440.0 | 1440.0 |
| 47.5 | 100.00 | 100.00 | 100.00 | 0.0 | 0.0 | 0.0 | 1440.0 | 1440.0 | 1440.0 |
| 48.0 | 100.00 | 100.00 | 100.00 | 0.0 | 0.0 | 0.0 | 1440.0 | 1440.0 | 1440.0 |
| 48.5 | 100.00 | 100.00 | 100.00 | 0.0 | 0.0 | 0.0 | 1440.0 | 1440.0 | 1440.0 |

TABLE 3

Elevation Constraint 5°

| Latitude | Coverage | | | Maximum Outage | | | Maximum in View | | |
|---|---|---|---|---|---|---|---|---|---|
| (deg) | Average | Maximum | Minimum | Average | Maximum | Minimum | Average | Maximum | Minimum |
| 25.0 | 99.98 | 100.00 | 99.85 | 0.2 | 2.0 | 0.0 | 1343.3 | 1440.0 | 952.5 |
| 25.5 | 99.99 | 100.00 | 99.93 | 0.1 | 1.0 | 0.0 | 1362.2 | 1440.0 | 952.5 |
| 26.0 | 100.00 | 100.00 | 99.97 | 0.0 | 0.5 | 0.0 | 1407.5 | 1440.0 | 953.5 |
| 26.5 | 100.00 | 100.00 | 100.00 | 0.0 | 0.0 | 0.0 | 1440.0 | 1440.0 | 1440.0 |
| 27.0 | 100.00 | 100.00 | 100.00 | 0.0 | 0.0 | 0.0 | 1440.0 | 1440.0 | 1440.0 |
| 27.5 | 100.00 | 100.00 | 100.00 | 0.0 | 0.0 | 0.0 | 1440.0 | 1440.0 | 1440.0 |
| 28.0 | 100.00 | 100.00 | 100.00 | 0.0 | 0.0 | 0.0 | 1440.0 | 1440.0 | 1440.0 |
| 28.5 | 100.00 | 100.00 | 100.00 | 0.0 | 0.0 | 0.0 | 1440.0 | 1440.0 | 1440.0 |
| 29.0 | 100.00 | 100.00 | 100.00 | 0.0 | 0.0 | 0.0 | 1440.0 | 1440.0 | 1440.0 |
| 29.5 | 100.00 | 100.00 | 100.00 | 0.0 | 0.0 | 0.0 | 1440.0 | 1440.0 | 1440.0 |
| 30.0 | 100.00 | 100.00 | 100.00 | 0.0 | 0.0 | 0.0 | 1440.0 | 1440.0 | 1440.0 |

TABLE 3-continued

Elevation Constraint 5°

| Latitude | Coverage | | | Maximum Outage | | | Maximum in View | | |
|---|---|---|---|---|---|---|---|---|---|
| (deg) | Average | Maximum | Minimum | Average | Maximum | Minimum | Average | Maximum | Minimum |
| 30.5 | 100.00 | 100.00 | 100.00 | 0.0 | 0.0 | 0.0 | 1440.0 | 1440.0 | 1440.0 |
| 31.0 | 100.00 | 100.00 | 100.00 | 0.0 | 0.0 | 0.0 | 1440.0 | 1440.0 | 1440.0 |
| 31.5 | 100.00 | 100.00 | 100.00 | 0.0 | 0.0 | 0.0 | 1440.0 | 1440.0 | 1440.0 |
| 32.0 | 100.00 | 100.00 | 100.00 | 0.0 | 0.0 | 0.0 | 1440.0 | 1440.0 | 1440.0 |
| 32.5 | 100.00 | 100.00 | 100.00 | 0.0 | 0.0 | 0.0 | 1440.0 | 1440.0 | 1440.0 |
| 33.0 | 100.00 | 100.00 | 100.00 | 0.0 | 0.0 | 0.0 | 1440.0 | 1440.0 | 1440.0 |
| 33.5 | 100.00 | 100.00 | 100.00 | 0.0 | 0.0 | 0.0 | 1440.0 | 1440.0 | 1440.0 |
| 34.0 | 100.00 | 100.00 | 100.00 | 0.0 | 0.0 | 0.0 | 1440.0 | 1440.0 | 1440.0 |
| 34.5 | 100.00 | 100.00 | 100.00 | 0.0 | 0.0 | 0.0 | 1440.0 | 1440.0 | 1440.0 |
| 35.0 | 100.00 | 100.00 | 100.00 | 0.0 | 0.0 | 0.0 | 1440.0 | 1440.0 | 1440.0 |
| 35.5 | 100.00 | 100.00 | 100.00 | 0.0 | 0.0 | 0.0 | 1440.0 | 1440.0 | 1440.0 |
| 36.0 | 100.00 | 100.00 | 100.00 | 0.0 | 0.0 | 0.0 | 1440.0 | 1440.0 | 1440.0 |
| 36.5 | 100.00 | 100.00 | 100.00 | 0.0 | 0.0 | 0.0 | 1440.0 | 1440.0 | 1440.0 |
| 37.0 | 100.00 | 100.00 | 100.00 | 0.0 | 0.0 | 0.0 | 1440.0 | 1440.0 | 1440.0 |
| 37.5 | 100.00 | 100.00 | 100.00 | 0.0 | 0.0 | 0.0 | 1440.0 | 1440.0 | 1440.0 |
| 38.0 | 100.00 | 100.00 | 100.00 | 0.0 | 0.0 | 0.0 | 1440.0 | 1440.0 | 1440.0 |
| 38.5 | 100.00 | 100.00 | 100.00 | 0.0 | 0.0 | 0.0 | 1440.0 | 1440.0 | 1440.0 |
| 39.0 | 100.00 | 100.00 | 100.00 | 0.0 | 0.0 | 0.0 | 1440.0 | 1440.0 | 1440.0 |
| 39.5 | 100.00 | 100.00 | 100.00 | 0.0 | 0.0 | 0.0 | 1440.0 | 1440.0 | 1440.0 |
| 40.0 | 100.00 | 100.00 | 100.00 | 0.0 | 0.0 | 0.0 | 1440.0 | 1440.0 | 1440.0 |
| 40.5 | 100.00 | 100.00 | 100.00 | 0.0 | 0.0 | 0.0 | 1440.0 | 1440.0 | 1440.0 |
| 41.0 | 100.00 | 100.00 | 100.00 | 0.0 | 0.0 | 0.0 | 1440.0 | 1440.0 | 1440.0 |
| 41.5 | 100.00 | 100.00 | 100.00 | 0.0 | 0.0 | 0.0 | 1440.0 | 1440.0 | 1440.0 |
| 42.0 | 100.00 | 100.00 | 100.00 | 0.0 | 0.0 | 0.0 | 1440.0 | 1440.0 | 1440.0 |
| 42.5 | 100.00 | 100.00 | 100.00 | 0.0 | 0.0 | 0.0 | 1440.0 | 1440.0 | 1440.0 |
| 43.0 | 100.00 | 100.00 | 100.00 | 0.0 | 0.0 | 0.0 | 1440.0 | 1440.0 | 1440.0 |
| 43.5 | 100.00 | 100.00 | 100.00 | 0.0 | 0.0 | 0.0 | 1440.0 | 1440.0 | 1440.0 |
| 44.0 | 100.00 | 100.00 | 100.00 | 0.0 | 0.0 | 0.0 | 1440.0 | 1440.0 | 1440.0 |
| 44.5 | 100.00 | 100.00 | 100.00 | 0.0 | 0.0 | 0.0 | 1440.0 | 1440.0 | 1440.0 |
| 45.0 | 100.00 | 100.00 | 100.00 | 0.0 | 0.0 | 0.0 | 1440.0 | 1440.0 | 1440.0 |
| 45.5 | 100.00 | 100.00 | 100.00 | 0.0 | 0.0 | 0.0 | 1440.0 | 1440.0 | 1440.0 |
| 46.0 | 100.00 | 100.00 | 100.00 | 0.0 | 0.0 | 0.0 | 1440.0 | 1440.0 | 1440.0 |
| 46.5 | 100.00 | 100.00 | 100.00 | 0.0 | 0.0 | 0.0 | 1440.0 | 1440.0 | 1440.0 |
| 47.0 | 100.00 | 100.00 | 100.00 | 0.0 | 0.0 | 0.0 | 1440.0 | 1440.0 | 1440.0 |
| 47.5 | 100.00 | 100.00 | 100.00 | 0.0 | 0.0 | 0.0 | 1440.0 | 1440.0 | 1440.0 |
| 48.0 | 100.00 | 100.00 | 100.00 | 0.0 | 0.0 | 0.0 | 1440.0 | 1440.0 | 1440.0 |
| 48.5 | 100.00 | 100.00 | 100.00 | 0.0 | 0.0 | 0.0 | 1440.0 | 1440.0 | 1440.0 |

What is claimed is:

1. A system including a plurality of artificial satellites in an inclined elliptic orbit orbiting the earth, said system comprising:

a plurality of satellites, respectively moving in inclined, common-period elliptical orbits providing continuous line of sight visibility and coverage of predetermined latitude regions of the earth, said satellites orbiting with orbital parameters to cause said orbits to overly one hemisphere for a longer period of time than the other, said orbital parameters controlling said orbits in a way that allows continuous visibility of at least one satellite from any point above a specified latitude in said one hemisphere, and coverage by at least one satellite from any point above a specified latitude in said one hemisphere, said satellites with orbits having apogees in said one hemisphere that have a height above the earth which is lower than a height necessary for geosynchronous orbit, each said communication satellite having a coverage element which covers a point on the earth.

2. A communication system as in claim 1, wherein there are at least twelve satellites.

3. A system as set forth in claim 2, wherein said one hemisphere is the northern hemisphere, further comprising at least six equatorial orbit satellites, wherein there is continuous visibility of, and coverage of, at least one satellite from any point situated above a given south latitude.

4. A method of satellite coverage of areas on the earth, including orbiting a constellation of inclined elliptic artificial satellites in inclined elliptic orbits, for providing continuous line-of-sight visibility to one hemisphere of the earth's surface; said method comprising the steps of:

providing a plurality of satellites, causing said satellites to orbit in inclined elliptical orbits with common-periods and with orbital parameters which cause said satellites to overly one hemisphere for a longer period of time than another, and to orbit at a radius less than that necessary for geosynchronous orbit; and using said satellites in orbit for coverage of the earth.

5. The method of satellite coverage including providing a constellation of artificial satellites in inclined elliptic orbits for providing continuous global line-of-sight visibility to and with any point on the earth's surface and within the maximum operating radius from the earth's center; said method comprising the steps of:

provideng twelve common-period elliptic-orbit satellites and six equatorial satellites;

causing said elliptic-orbit satellites to elliptically orbit with orbital parameters of period, inclination of angle, eccentricity and right ascension which are set to assure said continuous visibility and such that each said elliptic satellite spends more time over the northern hemisphere than said each elliptic satellite spends over the southern hemisphere, and said equatorial satellites having substantially common altitudes less than 10,000 km, and each said equatorial satellite having substantially the same period, so as to assure said continuous visibility; and using said twelve common-period elliptic-orbit satellites and said six equatorial satellites to cover the earth.

* * * * *